United States Patent [19]

Ladirat et al.

[11] Patent Number: 5,567,218
[45] Date of Patent: Oct. 22, 1996

[54] DEVICE FOR EXTRACTION BY POURING WITH A REGULATABLE FLOW RATE OF A MATERIAL MELTED IN A MELTER HAVING COLD WALLS

[75] Inventors: Christian Ladirat, Saint Laurent des Arbres; Henri Pilliol, Avignon; Jean-Pierre Gnilka, Bagnols sur Ceze, all of France

[73] Assignees: Commissariat a l'Energie Atomique, Paris; Compagnie Generale des Matieres Nucleaires, Velizy-Villacoublay, both of France

[21] Appl. No.: 229,575

[22] Filed: Apr. 19, 1994

[30] Foreign Application Priority Data

Apr. 29, 1993 [FR] France .................. 93 05079

[51] Int. Cl.⁶ .................................................. C03B 5/26
[52] U.S. Cl. ........................... 65/327; 65/347; 65/356; 65/374.12; 222/592; 222/600
[58] Field of Search ...................... 65/326, 327, 347, 65/347.12, 356; 266/236; 222/592, 600

[56] References Cited

U.S. PATENT DOCUMENTS

| | | | |
|---|---|---|---|
| 1,572,580 | 2/1926 | Troutman et al. | 65/326 |
| 1,643,601 | 9/1927 | Beebe | 65/352 |
| 2,186,718 | 1/1940 | Ferguson | 65/327 |
| 3,580,714 | 5/1971 | Lucek | 65/374.12 X |
| 3,580,976 | 5/1971 | de Bussy | 13/6 |
| 3,912,488 | 10/1975 | Sanford et al. | 65/326 |
| 4,017,294 | 4/1977 | Sanford et al. | 65/326 |
| 4,351,664 | 9/1982 | Bansal | 65/128 |

FOREIGN PATENT DOCUMENTS 2408418 6/1979 France .
2668726 5/1992 France .

OTHER PUBLICATIONS

92–227719 Abstract, Derwent for French Patent 2,668,726 (Boen et al), Oct. 1993.
"Glass–Melter Materials: Technical Options for the French Vitrification Process and Operations Experience Authors", By R. Bonniaud (CEA IRDI Marcoule), R. Demay (CEA, IRDI, Fontenay–aux–Roses), R. Richter (SGN, St. Quentin en Evelines), and L. Rozand (COGEMA, St. Quentin en Yvelines)—Vienna Conference of IAEA, Sep. 1986.

*Primary Examiner*—Donald E. Czaja
*Assistant Examiner*—Sean Vincent
*Attorney, Agent, or Firm*—Pearne, Gordon, McCoy & Granger

[57] ABSTRACT

Device for the extraction by pouring at a regulatable flow rate a molten material in a cold structure melter. The melter has at least one part of a floor around a pouring orifice cooled by a flow of water and a heat source able to melt the material to be melted. An orifice is provided in the floor of the melter, whose diameter D is equal to or larger than the thickness H of the wall forming the melter. A metal sleeve is provided, whose base has a shoulder which can be adapted to the side walls of the orifice. The sleeve has a central passage forming the pouring tube for the molten material and a clearence is provided between the side walls of the orifice and the base of the sleeve in order to receive an insulating material between the sleeve and the cold floor of the melter. A device is provided beneath the floor of the melter having a cooled, sliding blade, equipped with an actuator controlling its movement in translation along the orifice, thus determining its more or less large opening or closing state.

4 Claims, 4 Drawing Sheets

DEVICE FOR EXTRACTION BY POURING WITH A REGULATABLE FLOW RATE OF A MATERIAL MELTED IN A MELTER HAVING COLD WALLS

BACKGROUND OF THE INVENTION

The present invention relates in general terms to furnaces for producing or melting oxide materials, such as glass or ceramics, which have walls cooled by a flow of water.

The present invention more specifically relates to the problem of drawing off material melted in the furnace or melter and for this purpose aims at improving the prior art solutions which will now be described with reference to FIGS. 1a, 1b and 1c.

In these drawings the reference 2 designates the walls of a melting furnace or melter filled with a glass or a ceramic material in the liquid state 4.

FIG. 1a illustrates the simple, well-known process of sampling by over-flow, in which the side walls of the melter have an unequal height and by means of a throat 6 permit the discharge of the melted material by overflowing from part of the melter wall.

FIGS. 1b and 1c illustrate known solutions for sampling by extraction by gravity from an orifice made in the lower walls of the melter. In the case of FIG. 1b, direct sampling in the floor of the melter takes place by a pipe 8, heated by a lateral electric furnace 10, able to maintain the material in the molten state during its extraction. A thermal glass plug 12 obtained through the cooling of the pouring tube then makes it possible to seal the orifice when the necessary molten material quantity has been extracted.

FIG. 1c shows the same elements as in FIG. 1b, but with a metal plug 14 cooled by a flow of water in an envelope surrounding it and which is brought to the sampling orifice in order to seal the latter by cooling.

In the examples of FIGS. 1b and 1c, the pouring tubes are made from refractory material or precious metals, such as molybdenum and platinum, being reheated by an auxiliary, resistance or induction furnace 10.

The start of pouring or casting is controlled by adapting the internal diameter of the orifice, the length of the pouring tube and its temperature to the hydrodynamic characteristics of the molten material (viscosity).

A description of these procedures appear in the documentation of the Vienna Conference of IAEA, September 1986, in the article entitled "GLASS-MELTER MATERIALS: TECHNICAL OPTIONS FOR THE FRENCH VITRIFICATION PROCESS AND OPERATIONS EXPERIENCE AUTHORS", by R. BONNIAUD (CEA IRDI, Marcoule), R. DEMAY (CEA, IRDI, Fontenay-aux-Roses), R. RICHTER (SGN, St. Quentin en Yvelines) and L. ROZAND (COGEMA, St. Quentin en Yvelines).

However, these devices suffer from a certain number of deficiencies, which can be accepted in the glassmaking industry:
- the refractory parts are consumable wear-prone parts,
- the pouring stopping plugs interposed in the glass jet lead to liquid glass splashing,
- the cooling of the pouring tubes in order to set a glass plug takes place with a very considerable inertia and the operation is impossible when the glass flows at a temperature well above its softening point and when the melter is filled with molten glass.

However, these deficiencies are unacceptable in the case of cold structure, direct induction furnaces. Thus, in these furnaces, where the walls and floor are entirely cooled have no refractory material parts and therefore has a very considerable service life. This type of furnace is generally small with a reduced molten glass mass and the pouring device must permit a rapid action on the drawing off of the glass.

For an application in a nuclear environment, where this type of furnace is particularly suitable, the glass pouring stoppages must be very specific and must not splash molten glass onto the installations.

SUMMARY OF THE INVENTION

The present invention specifically relates to a device for extracting by pouring at a regulatable flow rate making it possible, by obviating the aforementioned disadvantages, to apply the same under particularly difficult conditions, such as e.g. in a nuclear environment or in glove boxes.

The invention therefore relates to a device for the extraction by pouring at a regulatable flow rate a molten material in a cold structure melter, said melter having at least one part of the floor around the pouring orifice cooled by a flow of water and a heat source able to melt the material to be melted, characterized in that it comprises:
- in the floor of the melter, an orifice whose diameter D is equal to or larger than the thickness H of the wall forming the melter,
- a metal sleeve, whose base has a shoulder which can be adapted to the side walls of the orifice, said sleeve having a central passage forming the pouring tube for the molten material, a clearance being provided between the side walls of the orifice and the base of the sleeve in order to receive an insulating material between said sleeve and the cold floor of the melter,
- beneath the floor of the melter a device having a cooled, sliding blade, equipped with an actuator controlling its movement in translation along the orifice, thus determining its more or less large opening or closing state.

As can be seen, the two essential means of the invention are the metal sleeve adaptable to the wall of the lower orifice of the melter and the sliding, cooled blade serving as a seal or cap for the lower orifice of the aforementioned sleeve. The sleeve has a flared shape towards the interior of its peripheral wall, so as to permit the outflow of the molten product and in the upper part forms the start for a throat for the flow of said seine product. The sliding blade device serving as a seal consequently makes it possible to regulate the flow rate by opening to a greater or lesser extent the lower orifice and has a water cooling in such a way that, in the position where the orifice is sealed, there is a continuous cooling at the bottom of the crucible and permitting the formation, in the base of the metal sleeve, of a solid crust of the product.

Another interesting feature of the invention is that the sliding blade has an inclined leading edge, which makes it possible to cut without difficulty the molten material jet flowing through the orifice during a position change of the seal or cap.

Another interesting feature of the invention is to produce the inner base of the metal sleeve so as to widen in the direction of the orifice. Most frequently, the insulating material between the sleeve and the cold floor of the furnace is constituted by an air jet or gap.

Finally and obviously, the expert will be able to choose the materials for forming the aforementioned parts as a function of the molten products. It is usually advantageous to make the sliding blade from refractory steel and the sleeve from molybdenum.

BRIEF DESCRIPTION OF THE DRAWINGS

The invention is described in greater detail hereinafter with reference to a non-limitative embodiment of the extraction device and with reference to the attached drawings, wherein show.

DETAILED DESCRIPTION OF THE PREFERRED EMBODIMENT

In the following description and for reasons of simplification, the molten material will be called glass, although any other meltable, oxide material, as well as ceramics can be applicable in the case of the extraction device according to the invention.

Figure 1A:
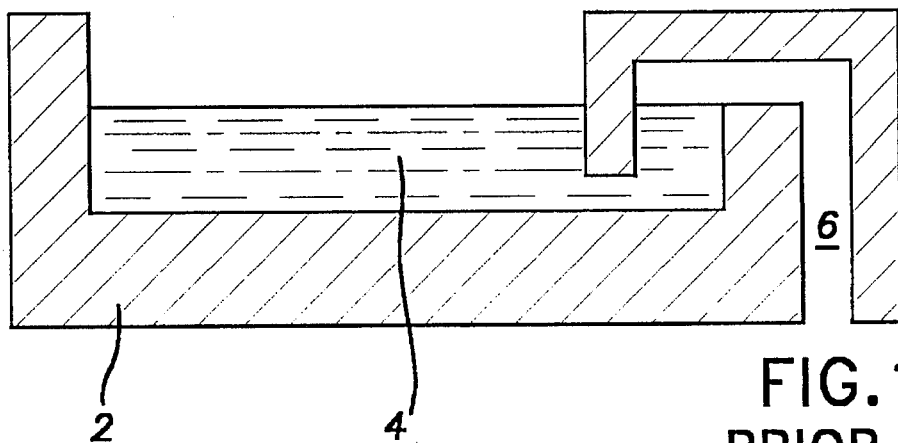
FIG. 1a A first known device for extraction by pouring of a molten material in melters.
Figure 1B:
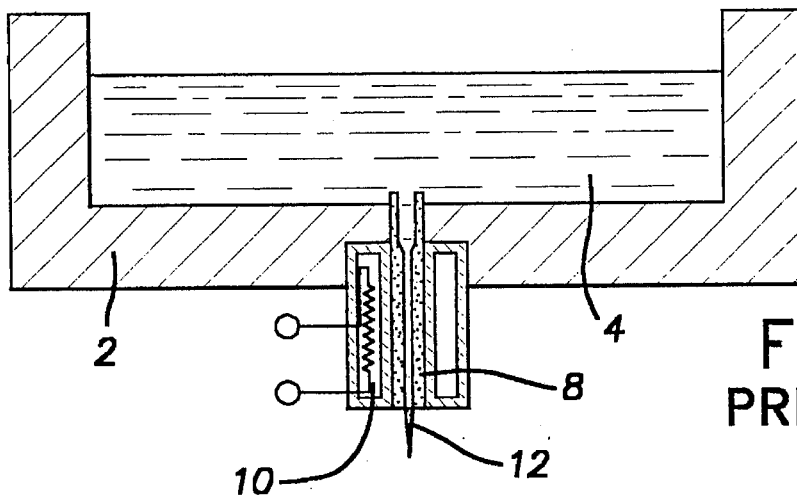
FIG. 1b A second known device for extraction by pouring of a molten material in melters.
Figure 1C:
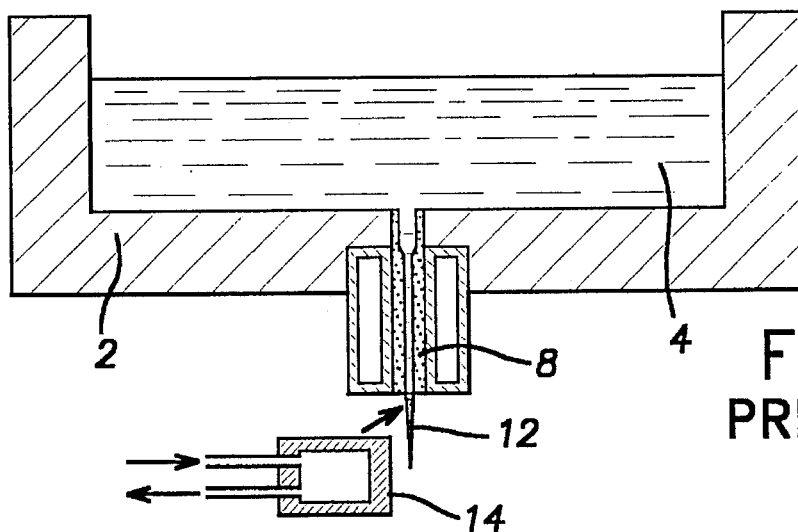
FIG. 1c A third known device for extraction by pouring of a molten material in melters.
Figure 2:
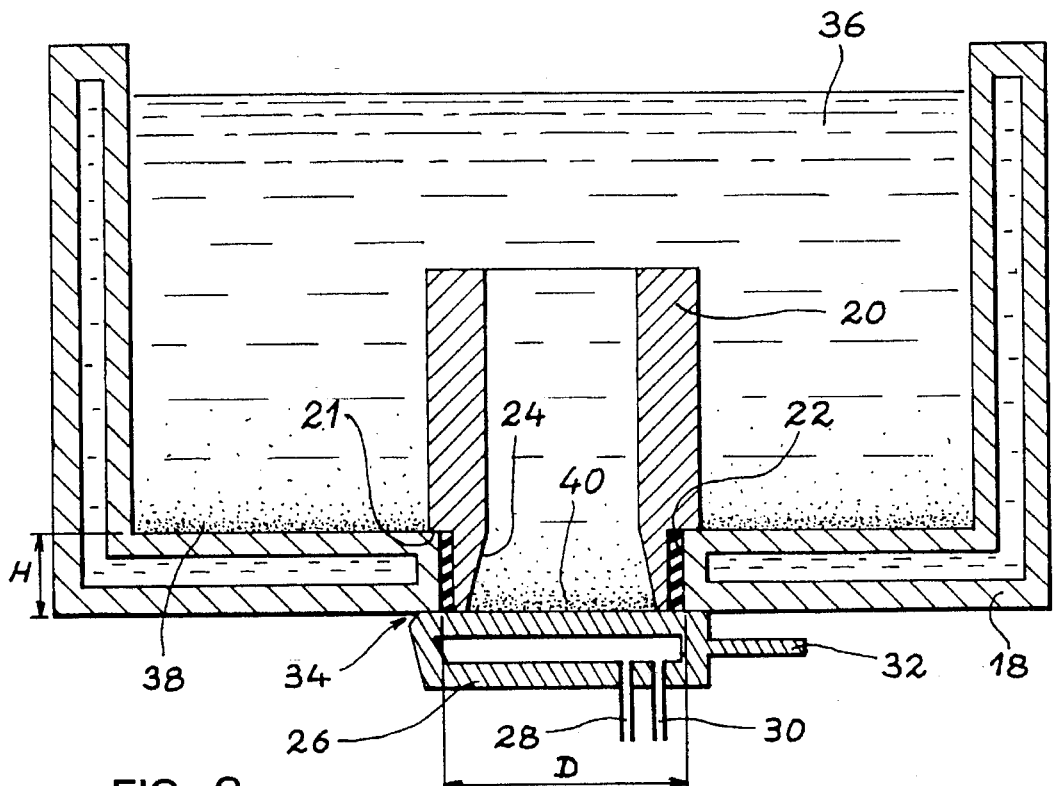
FIG. 2 The general diagram of the extraction device in the closed position.

With reference to FIG. 2, a description will firstly be given in general terms of the essential components of the invention, when the device is in the closed position. In the floor of the furnace, which is constituted by a water-cooled, double-wall, metal box 18, there is a single orifice having a diameter D equal to or larger than the thickness H of the melter floor.

This orifice is covered with a metal sleeve 20, whose material resists the corrosive action of the glass and in which is engaged the pouring tube. At its base the sleeve 20 has a shoulder 21 permitting the fitting thereof in the floor 18. A space 22, which contains either air or an insulating material, is provided between the tube 20 and the cold floor 18.

The orifices made in the floor of the furnace or melter and/or the pouring tube are perfectly cylindrical or preferably slightly conical 24, widening towards the bottom in order to facilitate the flow. Beneath said assembly a device having a blade 26 cooled by the circulation of water (entrance 28, exit 30) can slide and be positioned by means of an actuator 32 in such a way as to seal the orifice. The blade 26 is preferably made from a refractory metal and the different materials of the device are chosen so as to facilitate the sliding of the parts.

The blade has a cutting profile 34 in order to cut up the glass jet flowing through the orifice. In particular embodiments of the invention, devices having two or more cooled, mobile blades can also be envisaged for cutting up the glass jet. As the device is completely cooled, the extensional stresses to which the parts of said device are exposed are of a negligible nature. They can operate mechanically in the environment of the molten glass bath.

The innovation provided by the device makes it possible to apply it to products melted at high temperatures.

Figure 3:
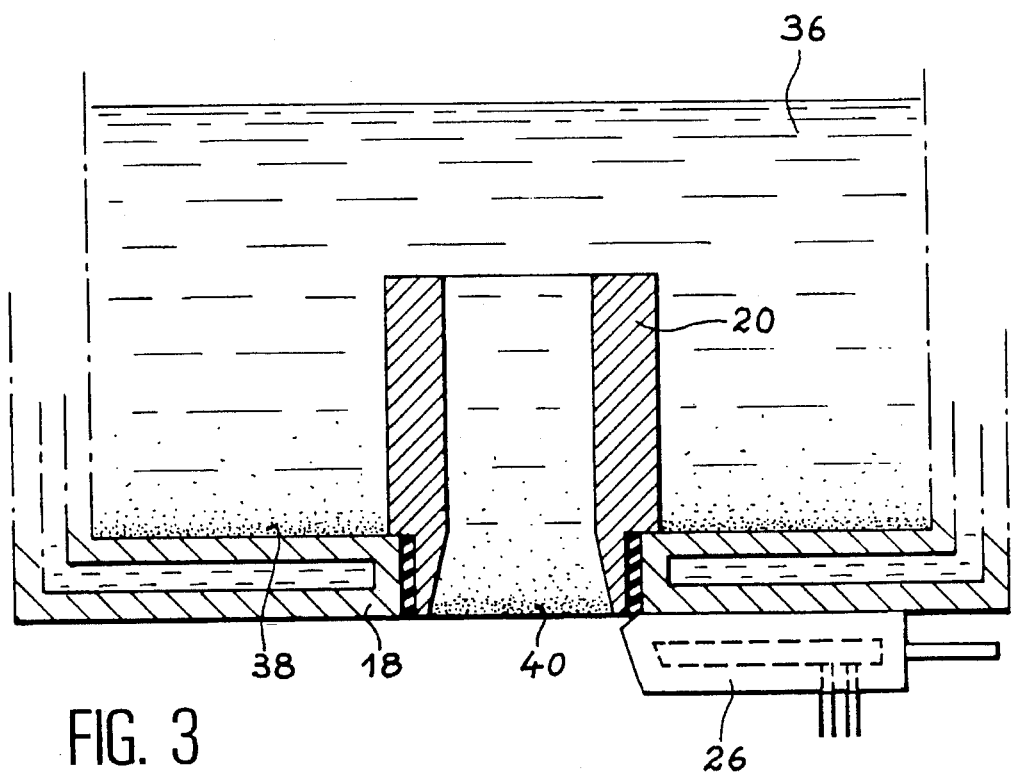
FIG. 3 The same device in the complete open position awaiting pouring.

In a glass production stage illustrated in FIG. 2, the sliding blade 26 is in the position with the pouring orifice completely closed. On contact with the cooled parts, a glass film 38, 40 forms, which adheres neither to the furnace floor, nor to the device blade 26. In order to cast or pour glass, the sliding blade 26 is positioned with the pouring orifice completely open in the manner shown in FIG. 3.

Figure 4:
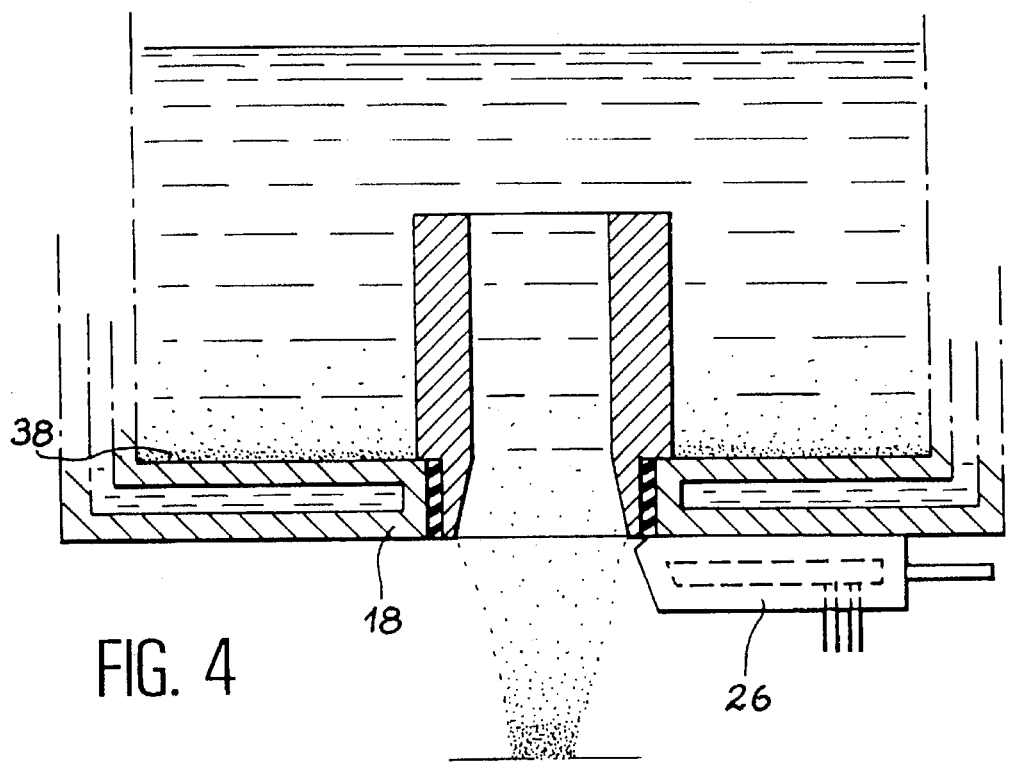
FIG. 4 The same extraction device in the total open position, the pouring of the molten material taking place.

The melting of the glass 40 which has set on contact with the blade 26 is obtained without any use of auxiliary heating. When the blade 26 is withdrawn, the metal sleeve 20 ensures the heat conduction between the melt and the set glass 40. The space 22, which either contains air or a thermal insulant, limits the heat losses to the cooled floor 18. The set glass 40 melts and releases the molten glass through the pouring orifice, as shown in FIG. 4.

It is necessary to use the sleeve 20 when the ratio between the diameter D of the orifice of the wall 18 and its thickness H is small (e.g. D/H=3). When the ratio is high (e.g. D/H>5), the sleeve 20 could be eliminated, because the thermal conduction of the calories coming from the melt into the set glass 40 is adequate to melt it, but its presence still ensures a good heat conduction.

The advantage supplied by the device consists of being able to melt the set glass plug without using auxiliary heating, with or without the use of the sleeve 20.

Figure 5:
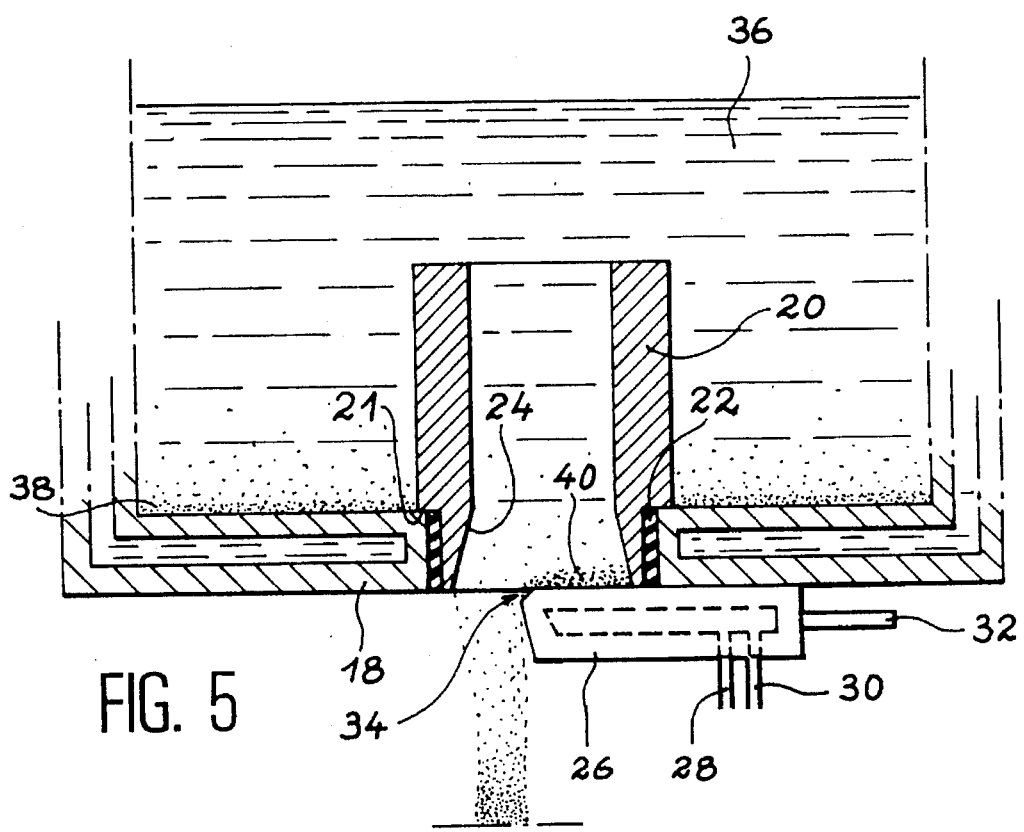
FIG. 5 The extraction device in the intermediate closed position for regulating the pouring rate of the molten material.

In FIG. 5, which shows the device half-open, the sliding blade 26 is positioned so as to partly seal the pouring opening and regulates the pouring rate. The positioning of the sliding blade 26 is made dependent, by means of the actuator 32, on the desired pouring rate, which is continuously measured.

Another advantage provided by the device is that it is possible to adjust the cross-section of the molten glass pouring orifice and in this way regulate the glass pouring rate.

The stopping of the pouring is brought about by positioning the cooled blade 26 in the closed position. The blade has a cutting profile 34 adapted to the cutting up of the glass jet. The stopping of pouring is immediate and the glass 40 sets on contact with the cooled blade 26 and retracts. This retraction effect causes the disengagement of the glass from the cooled blade 26 and makes possible the subsequent manipulations.

The operating principle described hereinbefore is based on the physical principle of non-adhesion of the glass, which undergoes a very rapid thermal tempering on an isothermal, cooled metal part.

For example, in accordance with the invention, production took place of a glass melting installation in the form of a cold crucible equipped with the following device:

the cold floor 18, cooled by the flow of water, has a thickness H of 15 mm. It has an orifice with a diameter D of 50 mm. The ratio between the diameter D and the thickness H of the orifice is 3.33.

The sleeve 20 is made from molybdenum and covers the cold floor 18 with a 1 mm space 22. The pouring tube has a diameter of 30 mm and a slight conicity 24 at its base over a height of 15 mm.

The sliding blade 26 is made from Inconel 601 and has a thickness of 15 mm, as well as a cutting angle 34 of 60°.

With a glass having a viscosity of 8 Pa.s at 1200° C., pouring rates exceeding 1000 kg/h are obtained when the blade is in the total open position. Once pouring has been established, it is possible to regulate the glass rate to values between 10 and 1000 kg by positioning the blade below the pouring orifice.

Figure 6:
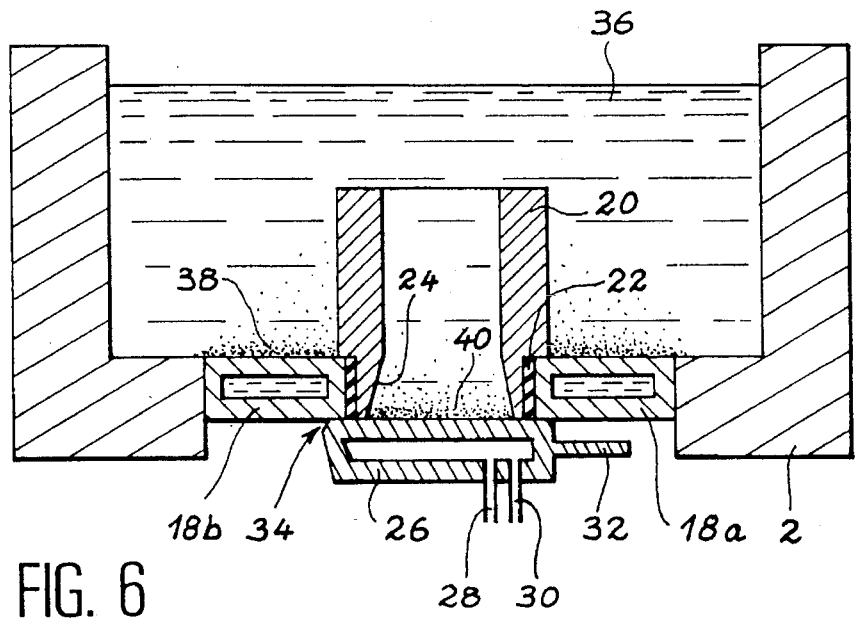
FIG. 6 The extraction device equipped with a melter having a partly cooled floor.
Figure 7:
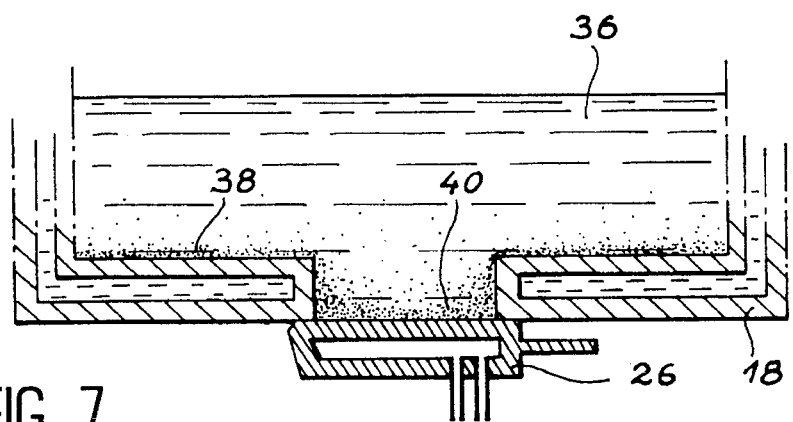
FIG. 7 Another example of an extraction device having a partly cooled floor and a pouring orifice without a sleeve.
Figure 8:
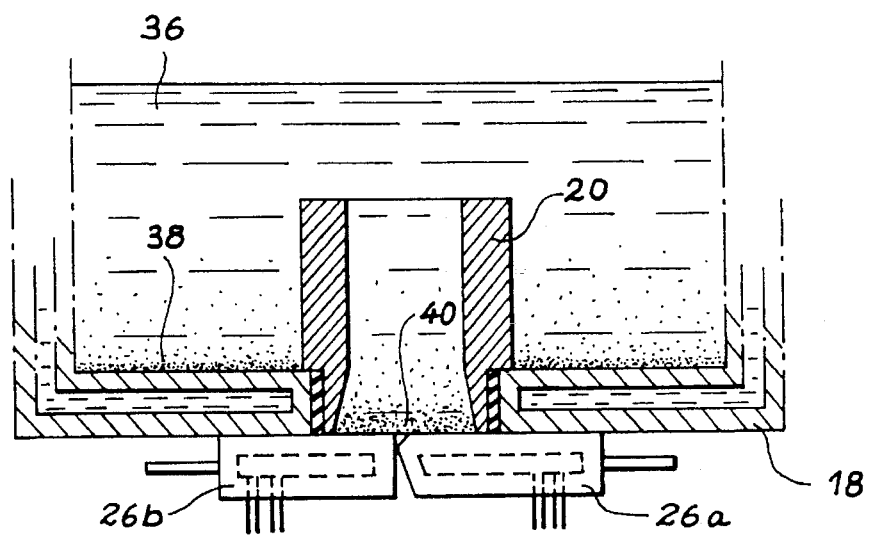
FIG. 8 An example of an extraction device having two mobile blades.

FIGS. 6, 7 and 8 show three variants of the extraction device according to the invention with a partly cooled floor 18a, 18b (FIG. 6), with a sleeveless device (FIG. 7) and with two mobile blades 26a, 26b (FIG. 8). In these drawings the corresponding components carry the seine reference numerals as in FIGS. 1 to 5.

We claim:

1. Device for the extraction by pouring at a regulatable flow rate a molten material in a cold structure melter, said melter having a floor at least a portion of which is cooled by a flow of water and a heat source able to melt material to be melted, said device comprising:

an orifice in the floor of the melter having side walls and a diameter equal to or larger than the thickness of the wall forming the melter;

a metal sleeve having an end extending within said melter for penetrating the molten material and a base at least a portion of which extends within said orifice, said sleeve having a central passage forming a pouring tube for the molten material, a clearance being provided between the side walls of the orifice and the base of the sleeve in order to receive an insulating material between said sleeve and the floor of the melter; and means for regulating the flow rate of molten material through said pouring tube including a cooled, sliding blade beneath the floor of the melter and an actuator controlling movement of the blade in translation along the orifice and the degree to which said blade closes said orifice to regulate the flow rate of the molten material through said pouring tube.

2. Device according to claim 1, wherein said sliding blade has an inclined leading edge.

3. Device according to claim 1, wherein said inner passage of said metal sleeve has a conical portion at the base and widened in the direction of the orifice.

4. Device according to claim 1, wherein said sliding blade is made from refractory steel and the sleeve from molybdenum.

\* \* \* \* \*